(12) United States Patent
Toba et al.

(10) Patent No.: US 8,385,627 B2
(45) Date of Patent: Feb. 26, 2013

(54) METHOD AND APPARATUS FOR INSPECTING DEFECTS OF SEMICONDUCTOR DEVICE

(75) Inventors: Tadanobu Toba, Yokohama (JP); Shuji Kikuchi, Yokohama (JP); Yuichi Sakurai, Yokohama (JP); Wen Li, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 855 days.

(21) Appl. No.: 11/500,979

(22) Filed: Aug. 9, 2006

(65) Prior Publication Data

US 2007/0036421 A1  Feb. 15, 2007

(30) Foreign Application Priority Data

Aug. 10, 2005  (JP) ................. 2005-231486

(51) Int. Cl.
 *G06K 9/00* (2006.01)
 *G06K 7/10* (2006.01)
 *G01B 5/28* (2006.01)
 *G06F 11/30* (2006.01)
 *H04N 3/14* (2006.01)
 *G01N 21/00* (2006.01)

(52) U.S. Cl. .......... 382/145; 382/181; 382/321; 702/35; 702/183; 348/296; 348/302; 356/237.5

(58) Field of Classification Search .................. 382/141, 382/145, 181, 321; 702/35, 183; 356/237.5; 348/296, 302
See application file for complete search history.

(56) References Cited

U.S. PATENT DOCUMENTS

| 5,317,408 | A | * | 5/1994 | Hirota .......................... 348/315 |
| 5,448,650 | A | * | 9/1995 | Desai et al. .................... 382/141 |
| 5,668,887 | A | * | 9/1997 | Parker et al. .................. 382/108 |
| 5,877,715 | A | * | 3/1999 | Gowda et al. ................. 341/122 |
| 6,047,083 | A | * | 4/2000 | Mizuno ......................... 382/141 |
| 6,987,873 | B1 | * | 1/2006 | Ben-Porath et al. .......... 382/145 |
| 7,151,568 | B2 | * | 12/2006 | Kawachi et al. .............. 348/302 |

FOREIGN PATENT DOCUMENTS

| JP | 10-312454 | 11/1998 |
| JP | 2001-229378 | 8/2001 |
| JP | 2001-312481 | 11/2001 |
| JP | 2003-216950 A | 7/2003 |
| JP | 2004-192405 A | 7/2004 |
| JP | 2005-004310 | 1/2005 |

\* cited by examiner

*Primary Examiner* — Kathleen Y Dulaney
(74) *Attorney, Agent, or Firm* — Mattingly & Malur, PC

(57) ABSTRACT

When an inspection apparatus of a semiconductor device repeatedly executes computation of prescribed area data, such as image processing for detecting defects, procedures for commanding, data load, computation, and data store need to be repeated the number of times of the computation. This may impose a limitation on the speeding up of the operation. In addition, when performing parallel computation by a high-capacity image processing system for handling minute images, a lot of processors are needed, resulting in an increase in cost. In order to solve the above-mentioned problems, in the invention, an inspection apparatus of a semiconductor device includes a data memory including an access section which is capable of reading and writing simultaneously, a plurality of numerical computation units, a connector for connecting the data memory and the numerical computation units, a controller for collectively controlling the contents of processing by the plurality of numerical computation units, another connector for connecting the numerical computation units and the controller, and a data transfer controller for controlling data transfer between the numerical computation units.

7 Claims, 12 Drawing Sheets

(a)

(b)

DETECTION IMAGE DATA g

REFERENCE IMAGE DATA f

DEVIATION

FIG.10(A)

| OP | [0] | [1] | [2] | [3] | [4] | [5] | [6] | [7] | [8] | |
|----|-----|-----|-----|-----|-----|-----|-----|-----|-----|---|
| F | DETECTION IMAGE DATA | | | | [f×f] | | | | m | |
| L[0] | (0,0) | (1,0) | (2,0) | (3,0) | (4,0) | (5,0) | (6,0) | (7,0) | (8,0) | 3 |
| [1] | (0,1) | (1,1) | (2,1) | (3,1) | (4,1) | (5,1) | (6,1) | (7,1) | (8,1) | |
| [2] | (0,2) | (1,2) | (2,2) | (3,2) | (4,2) | (5,2) | (6,2) | (7,2) | (8,2) | |
| | (0,3) | (1,3) | (2,3) | (3,3) | (4,3) | (5,3) | (6,3) | (7,3) | (8,3) | |
| | (0,4) | (1,4) | (2,4) | (3,4) | (4,4) | (5,4) | (6,4) | (7,4) | (8,4) | |
| | (0,5) | (1,5) | (2,5) | (3,5) | (4,5) | (5,5) | (6,5) | (7,5) | (8,5) | |
| | (0,6) | (1,6) | (2,6) | (3,6) | (4,6) | (5,6) | (6,6) | (7,6) | (8,6) | |
| n | (0,7) | (1,7) | (2,7) | (3,7) | (4,7) | (5,7) | (6,7) | (7,7) | (8,7) | |

| | [0] | [1] | [2] | [3] | [4] | [5] | [6] | [7] | [8] |
|---|-----|-----|-----|-----|-----|-----|-----|-----|-----|
| G | REFERENCE IMAGE DATA | | | | [g×g] | | | | m |
| L[0] | (0,0) | (1,0) | (2,0) | (3,0) | (4,0) | (5,0) | (6,0) | (7,0) | (8,0) |
| [1] | (0,1) | (1,1) | (2,1) | (3,1) | (4,1) | (5,1) | (6,1) | (7,1) | (8,1) |
| [2] | (0,2) | (1,2) | (2,2) | (3,2) | (4,2) | (5,2) | (6,2) | (7,2) | (8,2) |
| | (0,3) | (1,3) | (2,3) | (3,3) | (4,3) | (5,3) | (6,3) | (7,3) | (8,3) |
| | (0,4) | (1,4) | (2,4) | (3,4) | (4,4) | (5,4) | (6,4) | (7,4) | (8,4) |
| | (0,5) | (1,5) | (2,5) | (3,5) | (4,5) | (5,5) | (6,5) | (7,5) | (8,5) |
| | (0,6) | (1,6) | (2,6) | (3,6) | (4,6) | (5,6) | (6,6) | (7,6) | (8,6) |
| n | (0,7) | (1,7) | (2,7) | (3,7) | (4,7) | (5,7) | (6,7) | (7,7) | (8,7) |

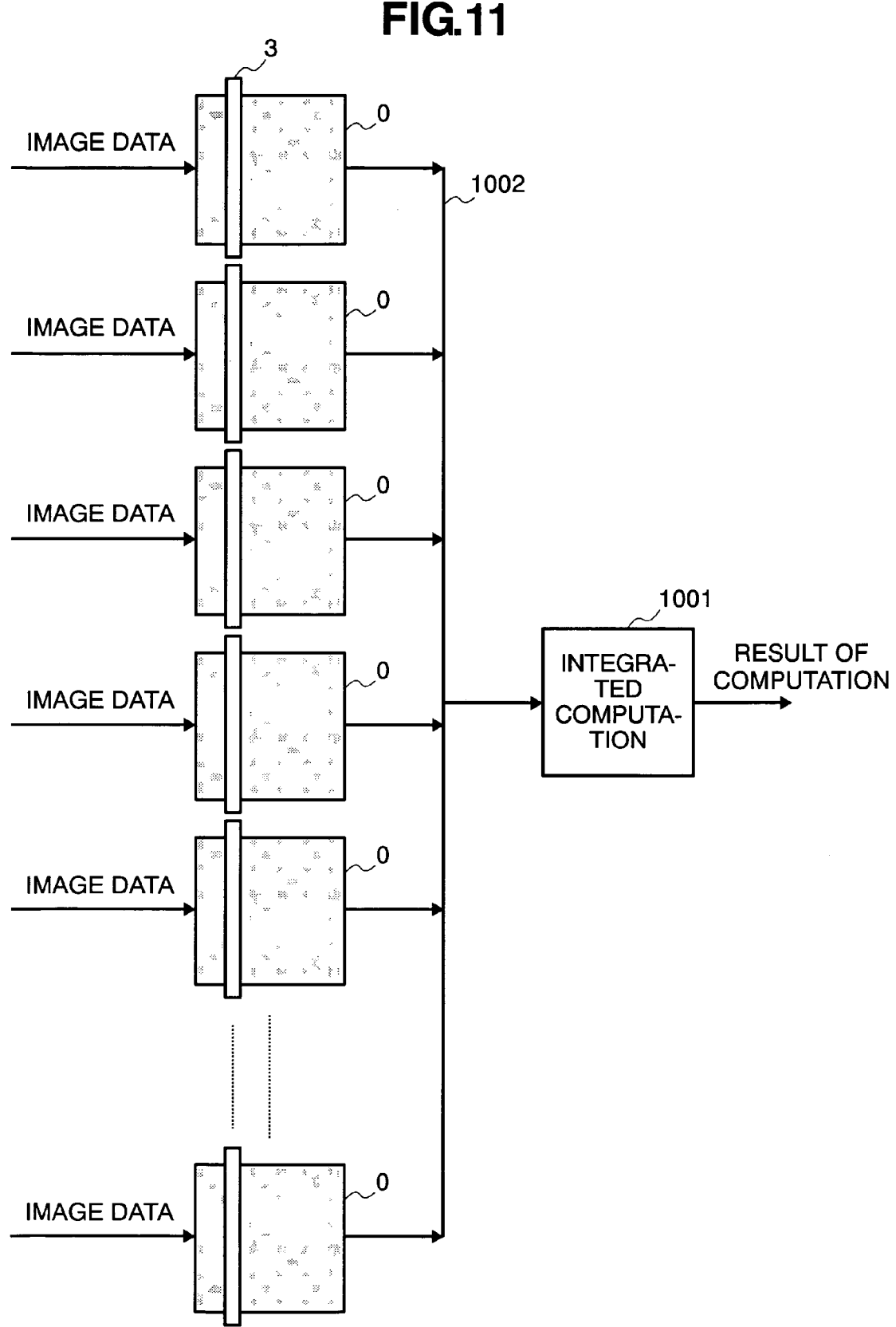

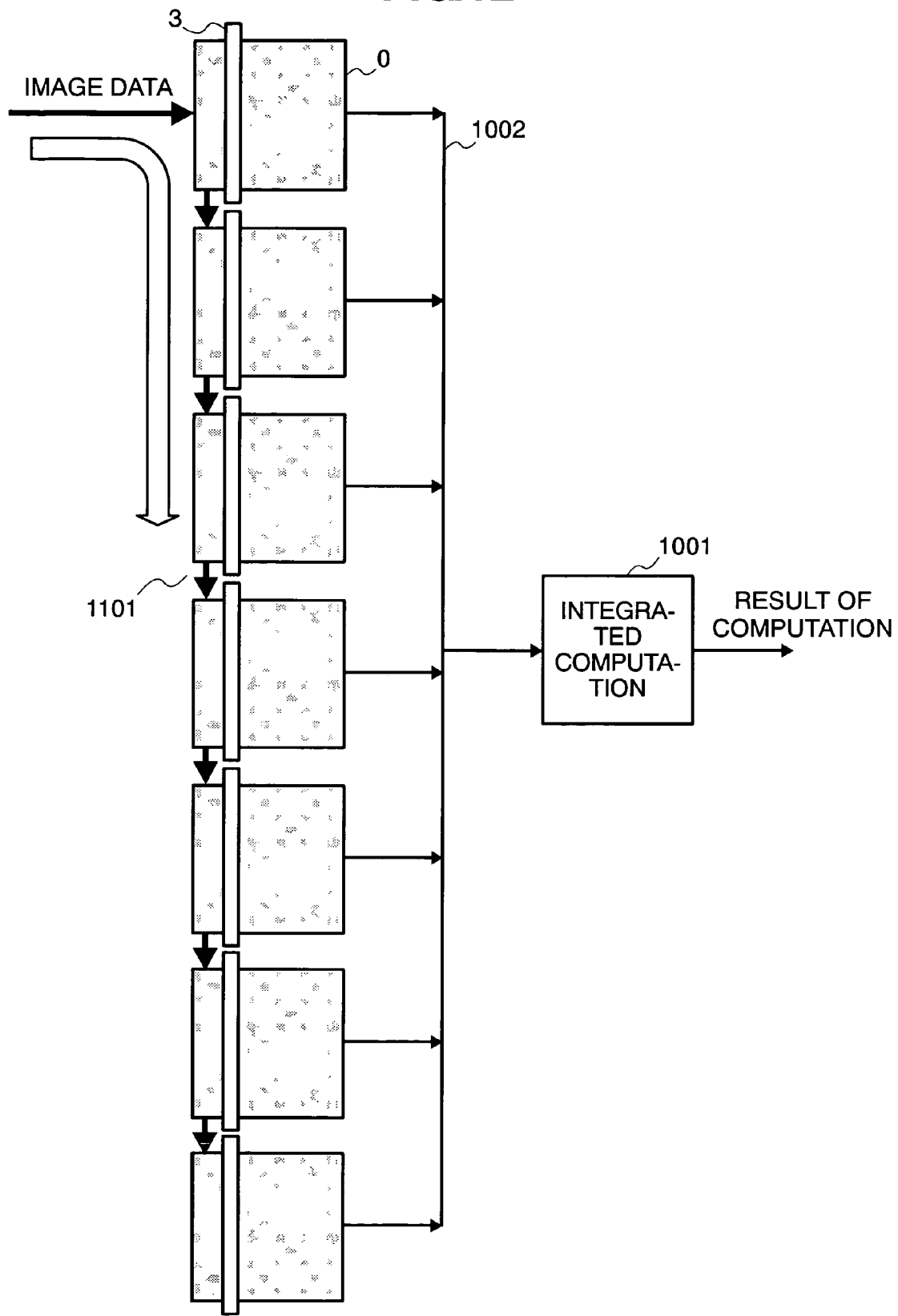

METHOD AND APPARATUS FOR INSPECTING DEFECTS OF SEMICONDUCTOR DEVICE

BACKGROUND OF THE INVENTION

The invention relates to an inspection system of an optical semiconductor device, a semiconductor device using electron beams or the like, or a circuit pattern of a substrate, and to an image processor therefor. More particularly, the invention is directed to a processor for numerical computation which is used for image processing in the inspection system and the image processor.

Conventionally, processors for performing numerical calculation or data processing have generally improved their processing capabilities by increasing their operational frequencies. Since the improvement by the operational frequency is approaching its physical limit and becomes difficult to achieve, products have been developed increasingly whose processing capabilities are improved by arranging processors in parallel, or by using processors dedicated for specific applications whose processing contents are specialized.

In the high-speed numerical calculation of much data for the image processing or signal processing, a digital signal processor (DSP) including a product-sum operation unit is often used. This DSP includes about one to four adders/subtracters and multipliers, and is designed to read a command stored in a memory, and to perform computation processing using super-scalar architecture with the above-mentioned computing unit according to the command.

Furthermore, some products improve their processing capabilities by arranging von Neumann computers in parallel. This improvement is achieved by dividing and executing processing by a number of computers in parallel, and transmitting and receiving data between the respective computers via a dedicated bus or the like.

As the similar arrangement system of processors, a processor called an array processor or a multi-core processor has been recently developed. This system is constructed by one chip composed of processor cores of a computer, notably the conventional von Neumann computer, which are arranged in parallel. The computer is, for example, a systolic array computer. This has a structure of a connection between a plurality of processors that match a processing algorithm or a computation formula, each processor executing the predetermined computation for every cycle, while transmitting and sending data in a pipeline manner. Some computers have improved their performance by previously connecting processor cores on a matrix, and decentralizing the processing by software.

A system modified from the array processor for effective computation has been proposed. For example, JP-A 312481/2001 discloses a system independently including an array computing unit, and an order controller for effectively executing both computing and controlling operations. JP-A 229378/2001 discloses a system provided with computing elements needed for a normalization correlation operation as an individual circuit, which is an array processor dedicated for an image processing. In the system, the computation is performed by the computing elements arranged in parallel, which constitute the computation pipeline.

SUMMARY OF THE INVENTION

In the image processing or signal processing, repetition of the computation, in particular, the product-sum operation at high speeds leads to improvement in performance of the system. In the general DSP, when repeated computation of prescribed area data, for example, in the case of image processing, is executed, a commanding process, a data load process, a calculation process, and a data store process need to be repeated the number of times of the repeated computation. This may impose a limitation on the speeding up of the operation. Moreover, in a parallel computer, software intervenes in expansion and recovery of the computation. This causes overhead which has a large influence on communications or software processing.

In a data processing system, such as a financial system, it is necessary to process a number of transactions at high speeds. For this reason, the parallel computer is generally used to improve the performance of the system. In integrated applications into the system, in order to ensure the necessary performance, the amount of hardware becomes large, resulting in an increase in cost.

Similarly, also in an array processor as disclosed in JP-A 312481/2001, overhead of software that expands the contents of processing in parallel or the like is large. In contrast, the systolic array processor has hardware according to the contents of processing, while no software intervenes therein. This enables the high-speed computation. However, since a computation sequence and the contents of the computation are defined by hard wires, the processing contents cannot be changed easily, which lacks flexibility. In particular, in application to an image processor, the flexibility in change of algorithms is very important.

In the disclosure described in JP-A No. 229378/2001, which is specialized for the image processing, a system deals with some computation variations by respective pieces of hardware dedicated therefor, thus making it difficult to support other image processing algorithms.

It is an object of the invention to provide a method and apparatus for inspecting defects of an optical or electron beam semiconductor device which includes computation processing means capable of executing image processing effectively, and which is adapted to inspect the semiconductor device or a circuit pattern of a substrate.

That is, in one aspect of the invention, an apparatus for inspecting defects of a semiconductor device includes image obtaining means for taking an image of the semiconductor device to obtain the image, image processing means for processing the image obtained by the image obtaining means to detect a defect, and for classifying the defect detected, and output means for outputting a result processed by the image processing means. The image processing means includes a data memory section capable of reading and writing simultaneously, a plurality of computation sections, a controller for outputting an instruction for collective computation to the plurality of computation sections, and a data transmission section for transmitting data between the plurality of computation sections.

In another aspect of the invention, a method for inspecting defects of a semiconductor device includes the steps of taking an image of the semiconductor device, and processing the image taken to detect a defect on the semiconductor device. In the step of processing the image taken, data on the image taken is stored in a data memory which is capable of reading and writing simultaneously, and the image data stored in the memory is collectively computed by a plurality of computation sections connected in parallel, whereby the defect of the semiconductor device is detected and classified.

According to the invention, a plurality of computation means are connected to each other in rows, and controlled by the control means. This can improve an operating rate of computing units arranged in parallel, thus enhancing the computation performance of the apparatus. Since a control circuit serving as a master gives collective control over the computation means, the size of the control circuit can be reduced, which results in a decrease in cost. At the same time, this can decrease a ratio of mounting of the control circuit to the LSI, which reduces influence of wiring delay, thereby resulting in an increase in an operational frequency, and improving the computation performance. A plurality of processors of the invention can be connected to improve the computation performance with ease. Since the control sequence does not need to be changed in connecting the plurality of processors, programs defining the computation sequence and the contents of computation do not need to be modified, thus easily improving processing capability of the apparatus.

These and other objects, features and advantages of the invention will be apparent from the following more particular description of preferred embodiments of the invention, as illustrated in the accompanying drawings.

BRIEF DESCRIPTION OF THE DRAWINGS

FIG. 10A is a diagram showing detection image data when a normalization correlation operation is executed;

FIG. 10B shows reference image data obtained in the normalization correlation operation;

FIG. 11 shows an example of processors connected in parallel according to the embodiment; and FIG. 12 shows a configuration example of data bus connections arranged in parallel according to the embodiment.

DESCRIPTION OF THE PREFERRED EMBODIMENTS

Preferred embodiments of the invention will be described hereinafter by taking some examples with reference to the accompanying drawings.

Figure 1:
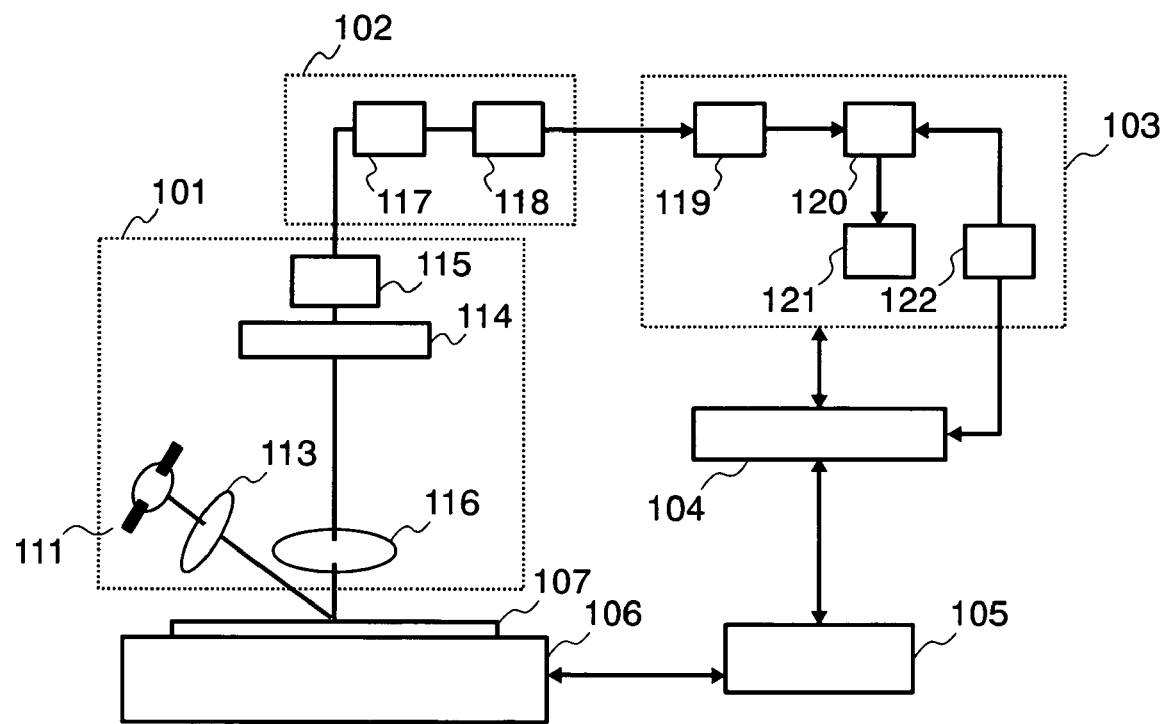
FIG. 1 shows a configuration example in which the invention is applied to an optical wafer defect inspiration system of a dark field type.

In a first preferred embodiment, a method for inspecting defects in an optical appearance inspection system targeted for a semiconductor wafer will be described below. FIG. 1 shows the first embodiment of a configuration of the optical inspection system of a dark field type. Reference numeral 107 denotes a specimen (an object to be inspected, such as a semiconductor wafer); reference numeral 106 a stage which supports the specimen 107, and which can be moved and rotated in an x-y plane, and moved toward a Z direction; and reference numeral 101 a detector. This detector 101 includes a light source 111 for irradiating the specimen 107, a lens system 113 for collecting light emitted from the light source 111, and an objective lens 116 for forming an optical image from the reflected and scattered light from the specimen 107, which has been irradiated with the light. The detector 101 also includes an image sensor 114 for receiving the optical image formed, and for converting the image into an image signal according to its brightness, and an AD converter 115 for converting an input signal (analog signal) from the image sensor 114 into a digital signal.

Although a lamp is used as the light source 111 in the embodiment shown in FIG. 1, a laser light source may be used. The laser light source may be one that emits laser light in ultraviolet range whose wavelength is shorter than 400 nm. In the present embodiment, a plurality of one-dimensional image sensors are arranged in the image sensor 114 in a two-dimensional manner, which constitutes a time delay integration image sensor, namely, a TDI image sensor. The use of a parallel output type sensor including a plurality of output taps as the TDI image sensor can process outputs from the sensor in parallel, thereby enabling high-speed detection.

An image editing unit 102 includes a preprocessing section 117 for performing image correction, such as shading correction, or dark level correction, of the digital signal of an image detected by the detector 101, and an image memory 118 for storing therein the corrected image signal.

An image comparison processor 103 is adapted to calculate suspected defects within the wafer serving as the specimen, to compare an image of the suspected defect to that of a corresponding area stored in the image memory 118 of the image editing unit 102, and to extract a deviation using statistical processing, thereby identifying the defect. First, a digital signal of the image of an area (hereinafter referred to as a reference image) which is stored in the image memory 118, and which corresponds to the image of an area of interest for inspection (hereinafter referred to as a detection image) is read out. A positional deviation detector 119 calculates an amount of correction for alignment. A statistical processor 120 aligns the detection image with the reference image using the calculated amount of positional correction, and outputs as a suspected defect a pixel which deviates statistically from the level of a corresponding reference pixel using the amount of feature of the corresponding pixel.

A parameter setting section 122 sets an image processing parameter, such as a threshold value, in extracting the suspected defect based on the difference value to feed it to the statistical processor 120. A defect classification section 121 extracts a real defect based on the amounts of features of the respective suspected defects, and classifies the defect according to the amount of feature (dimension, area, brightness, color, etc.). The positional deviation detector 119, the statistical processor 120, and the defect classification section 121 of the image comparison processor 103 constitute the image processor for performing an image processing computation. A whole controller 104 includes a CPU (incorporated in the whole controller 104) for performing various kinds of controls. The whole controller 104 is connected to a user interface including input means and display means for receiving a user's instruction to change a detection parameter, and for displaying information on the defect detected, and to a storage device for storing therein the amount of feature and the image of the suspected defect detected. A mechanical controller 105 drives the stage 106 based on a control command from the whole controller 104. Note that the image comparison processor 103 and the detector 101 are driven according to the command from the whole controller 104.

Although in the above description, the optical system of the dark field type has been described, the same goes for an optical inspection system of a bright field type as shown in FIG. 2A, or the so-called SEM (Scanning Electron Microscope) type inspection system for using an electron beam as shown in FIG. 2B.

In the optical inspection system of the bright field type as shown in FIG. 2A, light emitted from a light source 2111 is collected by a lens 2116, and then its optical path is changed by a beam splitter 2130. The light is applied to the specimen 107 mounted on a table 2106 via an objective lens 2113. The reflected light from the specimen is collected by the objective lens 2113, passes through the beam splitter 2130, and provides an optical image on a TDI image sensor 2114. An image signal is output from the TDI image sensor 2114 which has detected this optical image, and converted into a digital signal by the AD converter 2115. The table 2106 is controlled by a mechanical controller 2105 receiving a control command from a whole controller 2104. The configurations of the image editing unit 102 and the image comparison processor 103 as shown in FIG. 2A are the same as those shown in FIG. 1.

The SEM inspection system shown in FIG. 2B includes an electron beam generator 2201, a deflector 2202 for controlling scanning of the electron beam, a detector 2203 for detecting a secondary electron of the electron beam applied to the specimen 107, an AD converter 2204 for converting a detection signal from the detector 2203 into digital form, an image editing unit 102, an image comparison processor 103, a whole controller 2224, and a mechanical controller 2205. The configurations of the image editing unit 102 and the image comparison processor 103 as shown in FIG. 2B are the same as those shown in FIG. 1.

Figure 3:
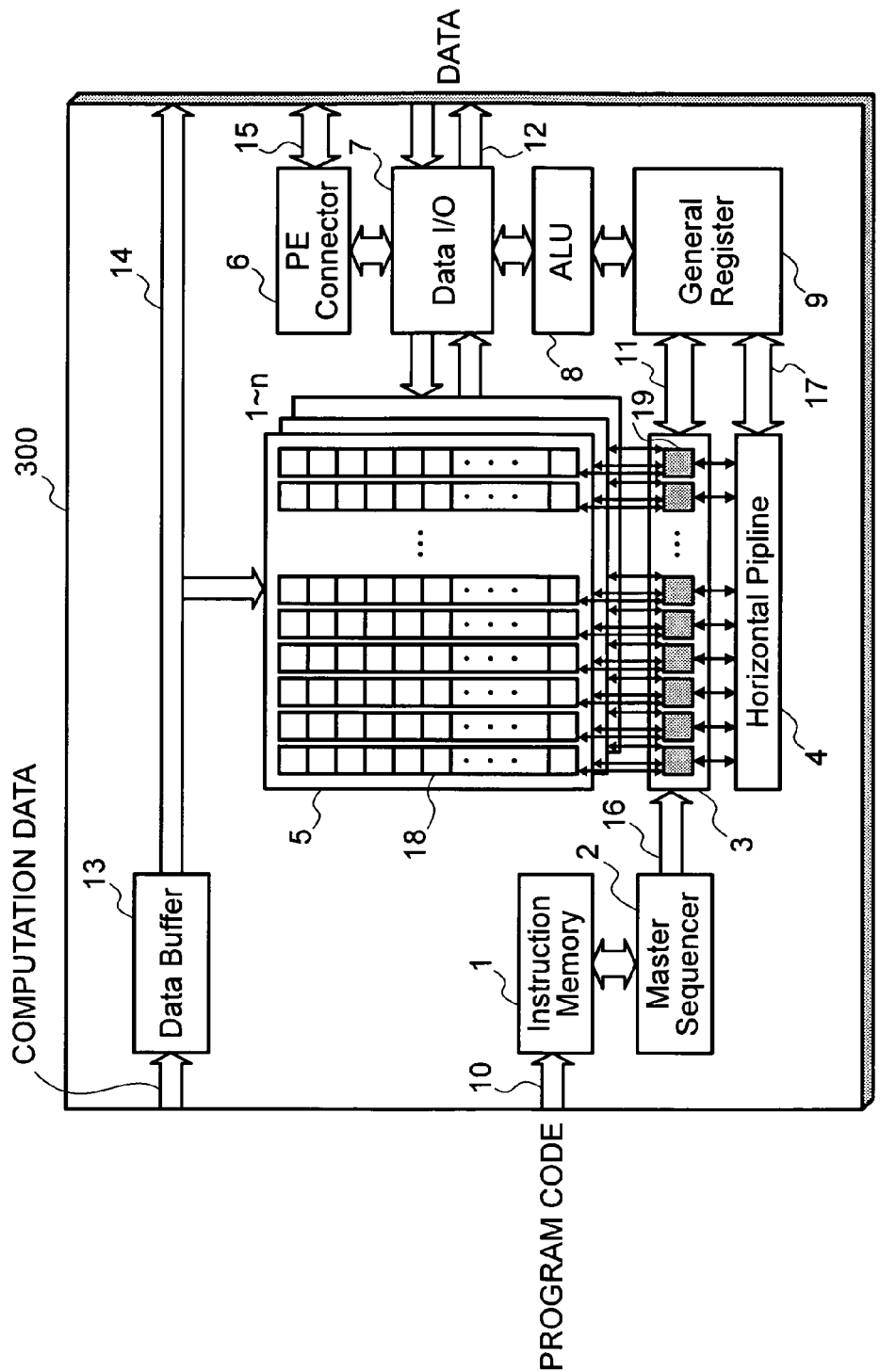
FIG. 3 shows a configuration example of an image processor according to one preferred embodiment of the invention.

FIG. 3 shows a configuration of a parallel image processor for speeding up image processing computation of the above-mentioned image comparison processor 103. In the present embodiment, the parallel image processor includes an instruction memory 1 for storing therein program codes defining the contents of computation and processing, a master sequencer 2 for interpreting programs of the instruction memory 1 and for controlling the order of execution of the programs in sequence, an operation array 3 including a plurality of processors or computing elements connected in an array shape, a multistage buffer 4 with a pipeline shape connected to the operation array, and a memory array 5 for storing therein data. The parallel image processor also includes a processor element connector 6 for controlling an interface with an external processor, a data I/O block 7 for reading and writing the result of computation or the data in the memory array, an ALU (Arithmetic Logic Unit) 8 for performing computation, including addition, subtraction, multiplication, and division, and a general register 9 serving as a temporary buffer. The parallel image processor further includes an input bus 10 into the instruction memory 1, a data bus 11 between the operation array 3 and the general register 9, an input and output bus 12 of the result of computation, a data buffer 13 for temporarily buffering when the image data is input, and a data transfer bus 14 for transferring data from the data buffer 13 to the memory array 5 and to the outside. In addition, the parallel image processor includes an external control signal bus 15 for connecting a control signal to the outside, a control signal bus 16 for transferring a control signal from the master sequencer 2 to the operation array 3, and a pipeline bus 17 for transmitting data between the multi-stage buffer 4 and the general register 9. The memory array 5 shown stores therein pixel data 18. Furthermore, operation units 19 are provided in the operation array 3 in parallel for serving as computing elements.

Reference will now be made to the embodiment of the optical inspection system shown in FIG. 1. An image signal obtained by the image sensor 114 is converted into digital image data by the AD converter 115. The image data converted is transferred to the image editing unit 102 and the image comparison processor 103, and then subjected to an image processing computation. The image comparison processor 103 includes the positional deviation detector 119, the statistical processor 120, the defect classification section 121, and the parameter setting section 122, and is adapted to perform the computation for image processing aimed for detection and classification of defects. The image processor 300 shown in FIG. 3 is applied to this image comparison processor 103. Note that this processor may be used together with a general compressor, or a DSP. The image data obtained by the image sensor 114 is transmitted to the image comparison processor 103 via the image editing unit 102, especially, to the positional deviation detector 119, which is one of components of the image processor 300. A computing operation of the image processor 300 involves storing a program code from the input bus 10 into the instruction memory 1, and causing the master sequencer 2 to interpret the program code, and to execute an operation based on the code.

The master sequencer 2 controls the order of data load, computation of the operation array 3, and the like according to the contents of the program code. The operation array 3 performs data processing and computation according to instructions from the master sequencer 2. More specifically, the operation array 3 executes the processing and computation using the data of the memory array 5. The memory array 5 includes a plurality of surfaces (first to n'th surfaces shown in the figure). The memory array 5 is used to store therein processing data as well as the results of processing and computation. The image data obtained by the image sensor 114 has sequentiality, and is cut into a plurality of pieces, each having the predetermined size, which are stored in the plurality of surfaces of the memory array 5 in sequence. The computation processing starts from the memory surface of the memory array 5 in which the image data has been stored. In tandem with this, the other image data pieces which have not been stored yet continue to be stored sequentially in the other respective surfaces.

The pipeline buffer 4 temporarily holds the result of computation by the operation array 3, while moving the computation result in the pipeline manner, thereby outputting it to the outside. Additionally, the computation, such as addition, subtraction, and the like, is performed every step, so that the result of computations within the operation array 3 can be organized. The processor element connector 6 controls outputting of the control signal when a plurality of processors according to the invention are combined in use. The data I/O block 7 is a data bus through which data on the result of computation is output to external individual chips. The ALU 8 is a block for performing single computation using data in the operation array 3, the pipeline buffer 4, and the memory array 5. A plurality of ALUs 8 may be provided. The general register 9 temporarily holds part of data of the operation array 3, and the pipeline buffer 4.

Figure 4:
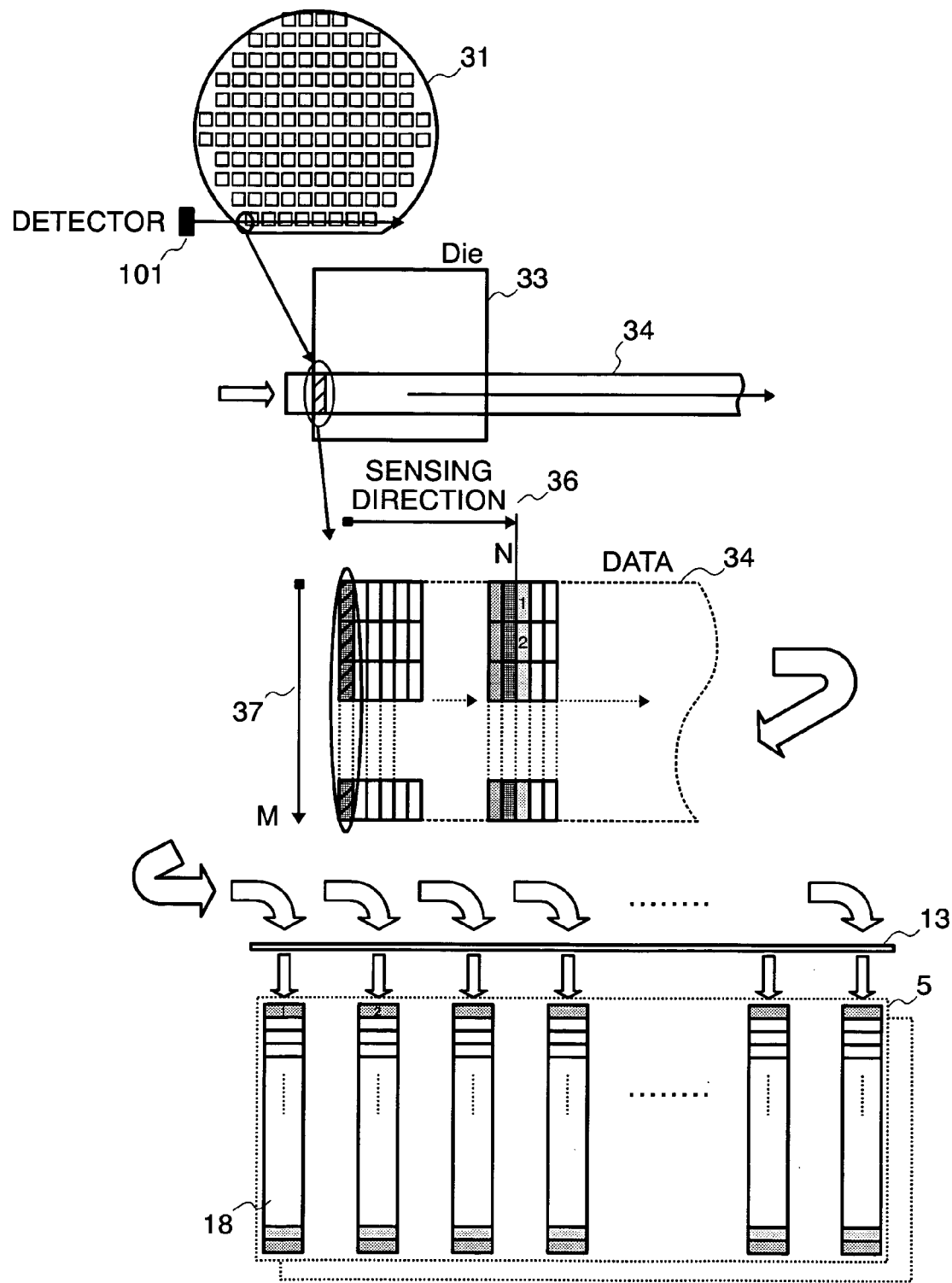
FIG. 4 shows a method for obtaining image data in inspecting a defect on a wafer according to the embodiment.

FIG. 4 shows an example of a data inputting operation of the optical wafer inspection system using the image processor 300 shown in FIG. 3, and a data storing operation thereof into the memory array. The wafer 31 of interest for detection is sensed, and the image signal is detected by the detector 101 as digital image data. A sensing area 34 which is a part of a die 33 is paid attention to, and the image data is input into the following component with the width of pixel M (37) captured via an image sensor 114, and with N pixels (36) in the sensing direction. This data is stored in the memory array 5 of the image processor 300 via the data transfer bus 14. The image data is distributed among the M pieces of the two-dimensional memory array 5, the value of M corresponding to the pixel width captured, and stored every N pixels in the sensing direction. The memory array 5 includes a plurality of surfaces, each serving as one unit of processing. The image data is stored every N pixel width in the corresponding surface of the memory array 5.

Figure 2:
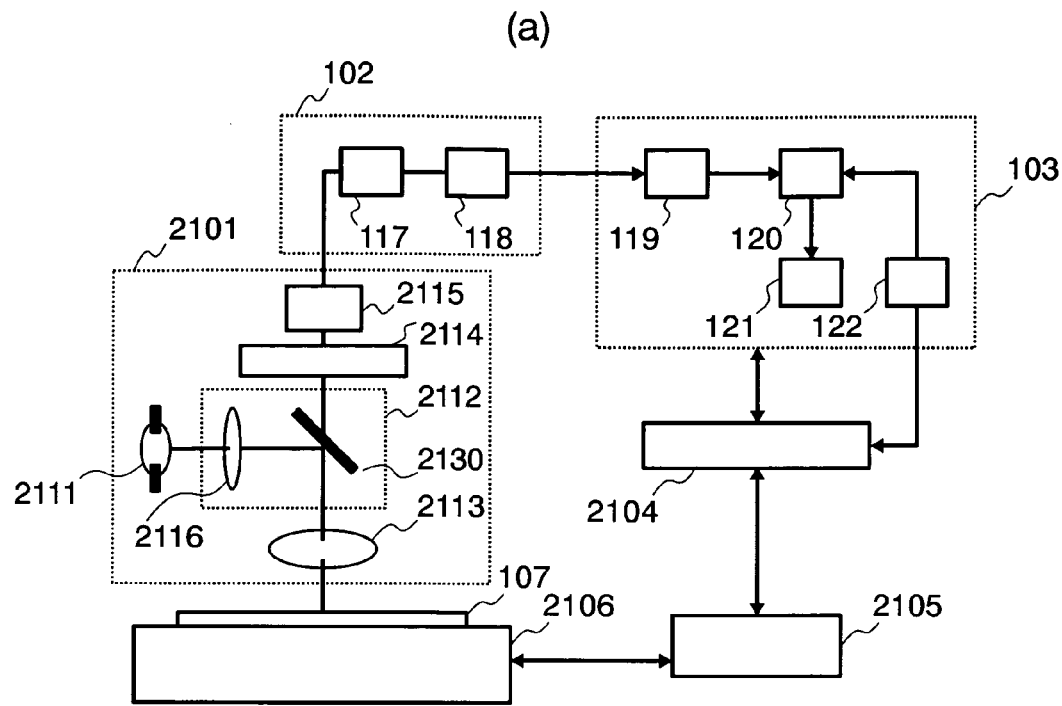
FIG. 2A shows a configuration example in which the invention is applied to an optical inspection system of a bright field type.
FIG. 2B shows a configuration example in which the invention is applied to an electron beam type wafer defect inspection system.
Figure 2:
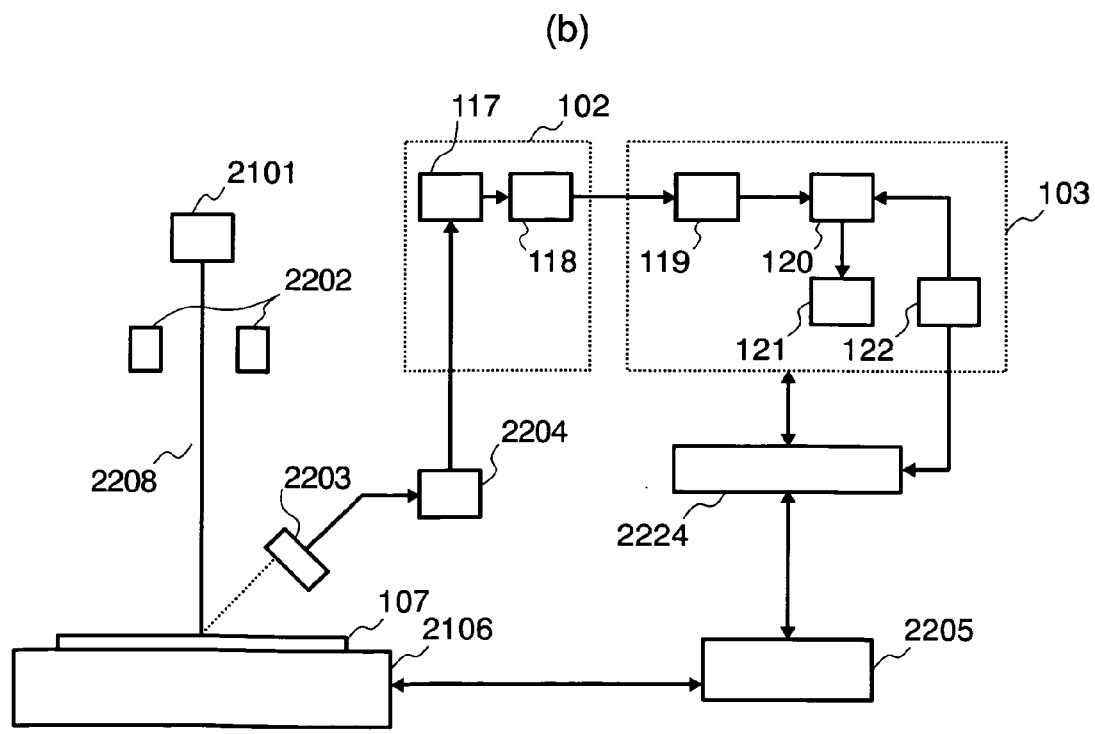
Figure 5:
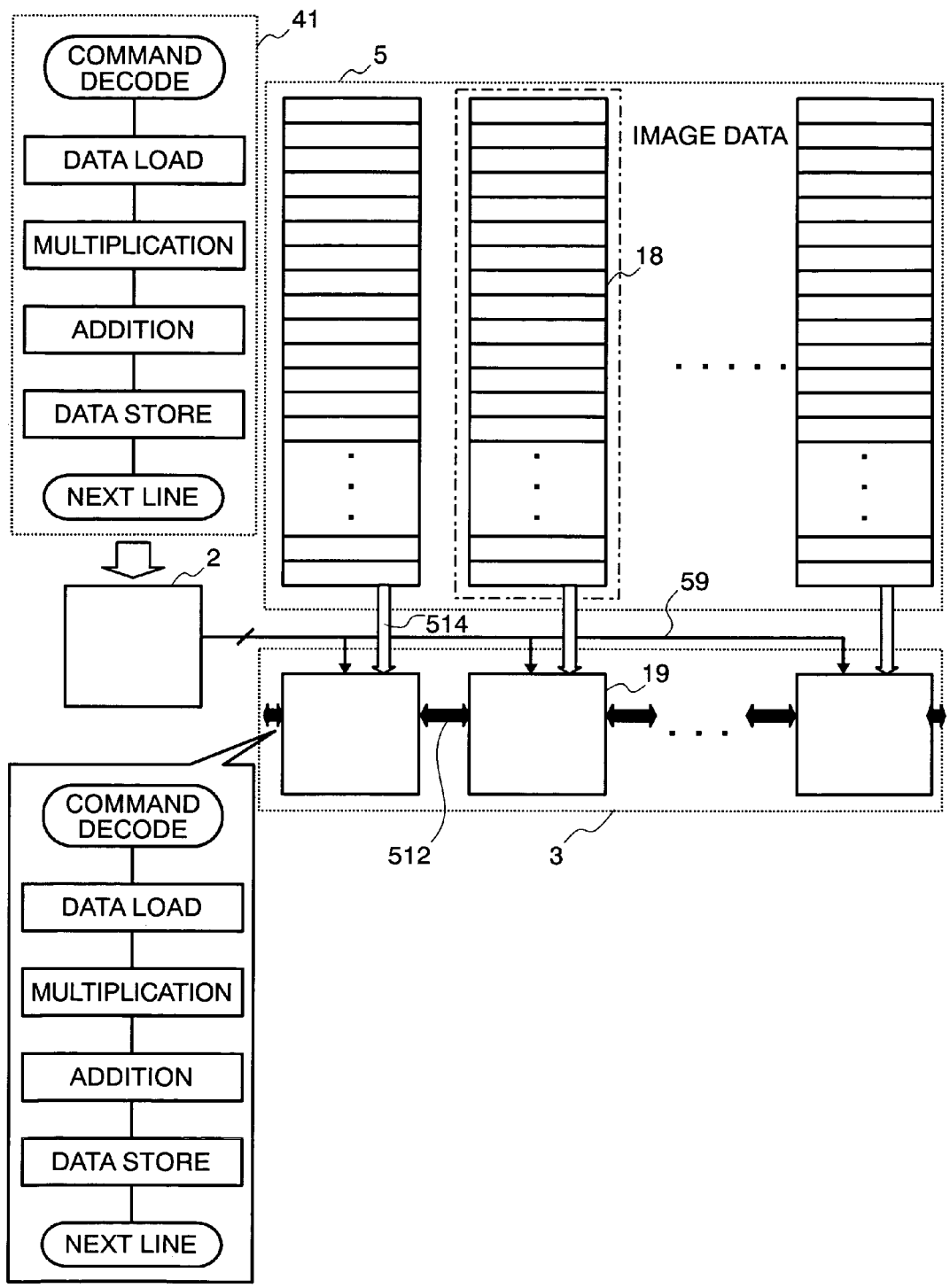
FIG. 5 shows a computation processing method by an image processor according to the embodiment.

FIG. 5 schematically shows an operation of computation processing of the image data stored in the above-mentioned memory array 5. The operation array 3 controlled by the master sequencer 2 is composed of operation units 19 serving as computation means, including processor cores arranged in parallel, and the computing elements. The master sequencer 2 executes a processing sequence defined by the program code. For example, when a processing flow, of the flowchart 41 of FIG. 2 is defined by the program code, the order of execution of the processing is collectively controlled based on a control signal 59 sent from the master sequencer 2 to all operation units 19 within the operation array 3. The image data stored in the memory array 5 is fed to the memory array by every unit of the array to the corresponding operation unit 19 using a data input and output bus 514. The respective operation units 19 sequentially perform the computation processing of the image data fed. A shift bus 512 is provided to perform the computation processing that needs transmitting and receiving the image data or the result of computation between the adjacent operation units 19. This performs the image processing computation of the two-dimensional image data stored in the memory array 5.

Figure 6:
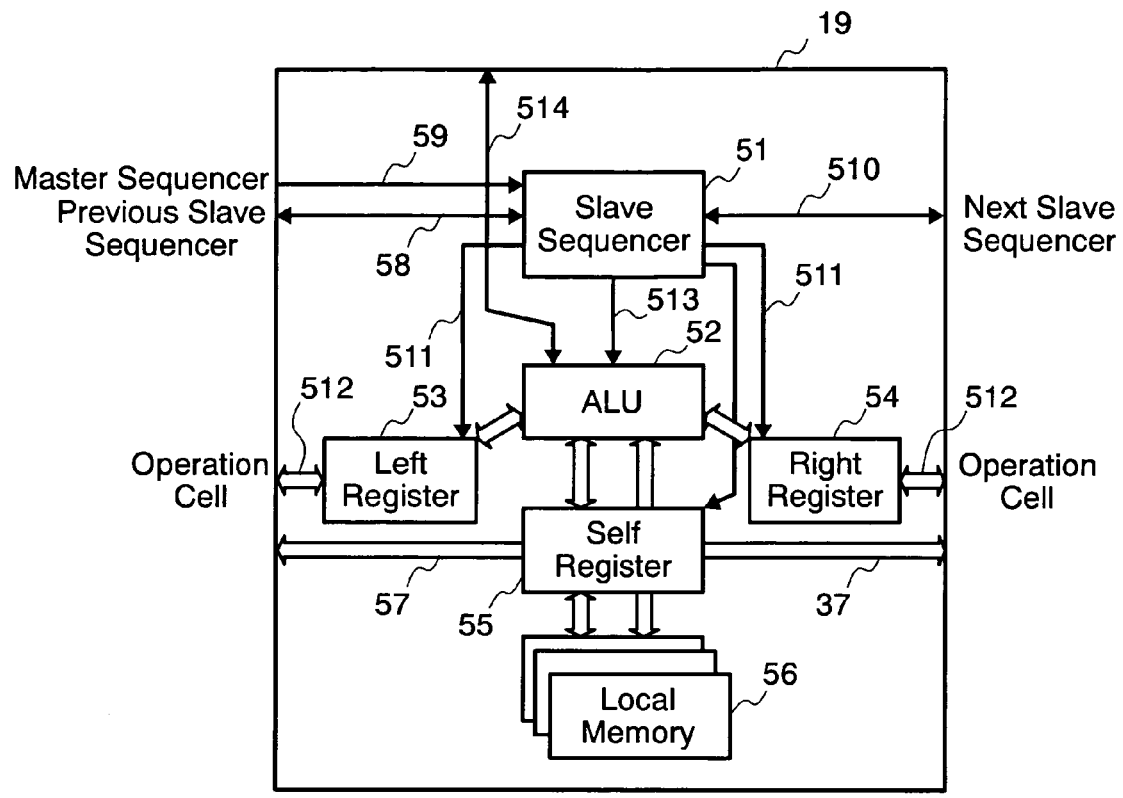
FIG. 6 is a block diagram of an operation cell within the image processor according to the embodiment.

FIG. 6 shows an example of a configuration of the operation unit 19. The operation unit 19 includes a slave sequencer 51, an ALU 52, a left register 53 serving as a temporary buffer for transmitting and receiving data, a right register 54, a self register 55 for the temporary buffer within the self unit, and a local memory 56 used for storing the data in the self unit. The slave sequencer 51 receives a computation processing instruction 59 input from the master sequencer 2, and controls the order of computation and execution among the operation units 19. The ALU 52 is a computing circuit, and the left and right registers 53 and 54 serve as the temporary buffer for transmitting and receiving the data between the operation units 19 in the operation array 3. The self register 55 is used to temporarily hold the result of calculation by the ALU 52. The local memory 56 aims for temporarily holding the result of computation and the data.

Figure 7:
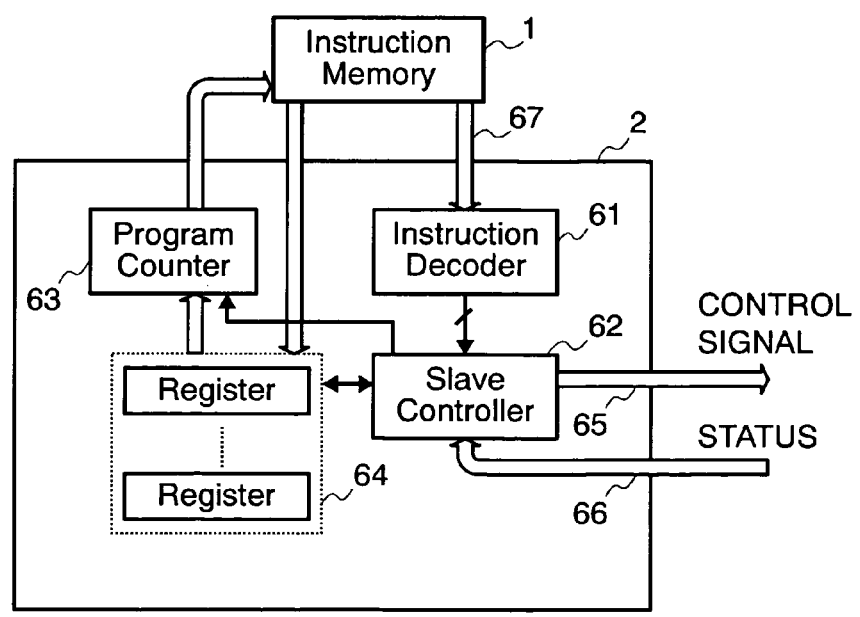
FIG. 7 shows a block diagram of a master sequencer within the image processor according to the embodiment.

FIG. 7 shows an example of the master sequencer 2. From the instruction memory 1, a program code 67 is input. The master sequencer 2 includes an instruction decoder 61, a slave controller 62, a program counter 63, and a group of registers 64. The slave controller 62 collectively transmits control instructions to the group of the operation units based on the result of decoding by the instruction decoder 61. At the same time, in order to capture a next instruction, the slave controller 62 updates the program counter 63, and then causes the instruction decoder 61 to capture a new program. The slave controller 62 utilizes the group of registers 64 when an address or the like of the instruction memory needs to be held temporarily.

Figure 8:
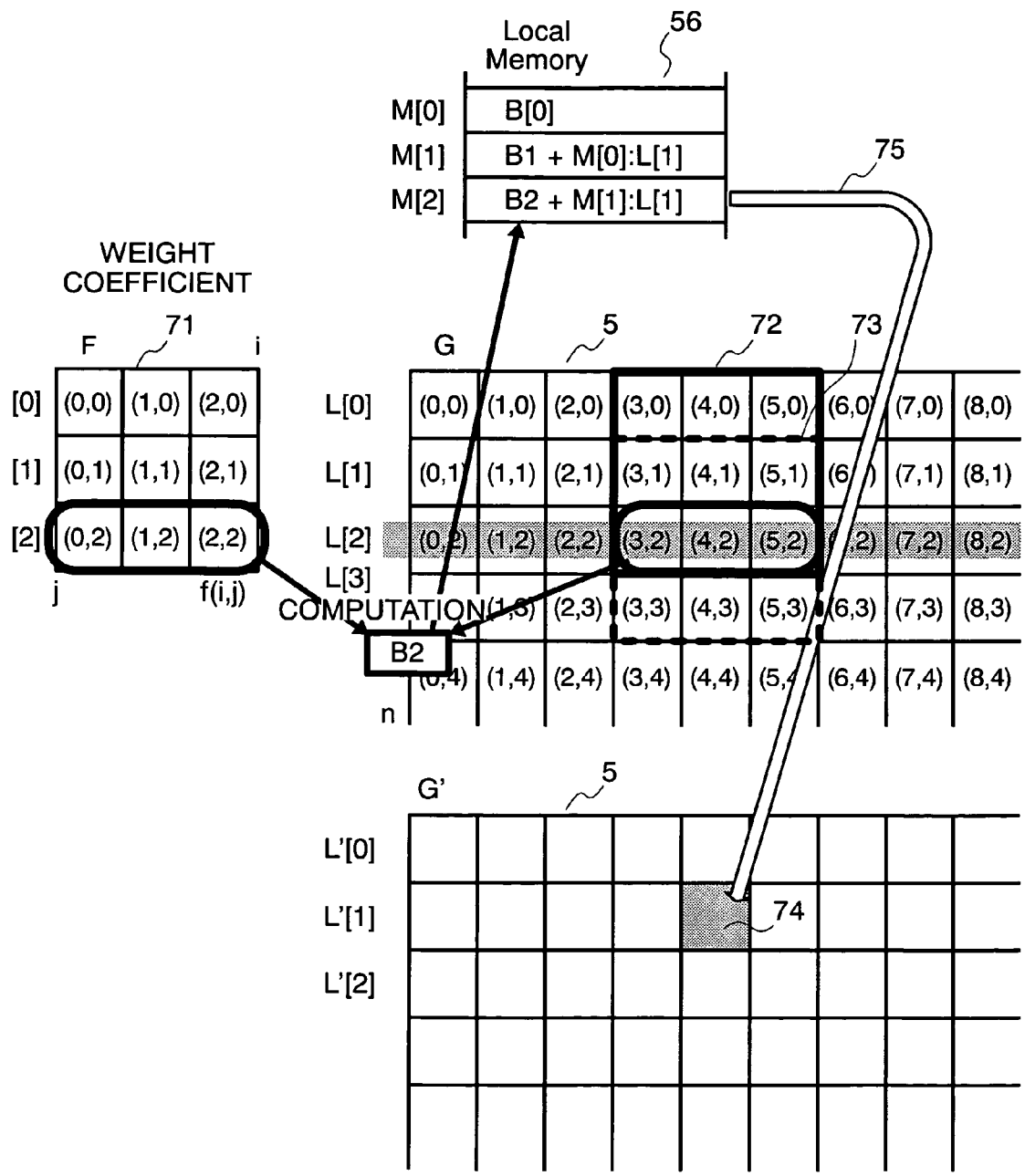
FIG. 8 is a diagram explaining a spatial filter computing method.

Now, a computation method by the image processor 300 of the embodiment will be described in detail. The image processor 300 stores a weight coefficient in the general register 9 shown in FIG. 3, and the image data of interest for filter computation in the memory array 5, thereby performing the computation processing. For the optical inspection system, various kinds of filter computation are used in order to eliminate an influence of optical noise, such as variations in brightness, or interference fringes. FIG. 8 illustrates a 3×3 spatial filter computation as one example. When F is a 3×3 weight coefficient matrix 71 stored in the general register 9, and G is two-dimensional image data stored in the memory array 5, the spatial filter computation is carried out according to the following formula (1):

$$V = \Sigma Fi \cdot Gi / \Sigma Fi (I=0, 1, \ldots 8) \qquad (1)$$

In the 3×3 spatial filter computation, the operation array 3 of the image processor 300 sequentially loads the image data disposed in the memory array 5 in the two-dimensional manner in units of rows. In an example of FIG. 8, the image data is sequentially loaded in the respective operation cells 19, while designated as L [0], L [1], L [2] . . . , whereby the computation processing is carried out. In this example, for a computation cell of interest (4, 1), a result is obtained after the computation of the (4, 2) of the L [2], and then stored in a memory array corresponding to the (4, 1). More specifically, in the operational flow of the computation processing, each operation cell 19 receives data from the adjacent cell after receiving the data input from the memory array 5, and then performs computation using the weight coefficient and the adjacent cell value.

When F is the general register 9 for storing therein the weight coefficient, and G is the memory array 5, in the example shown, the computation of the (4, 1) cell at the L [2] is as follows, and then is stored temporarily in the local memory 56.

$$B0 = \{G(3,2)\} \times F(0,0) + \{G(4,2) \times F(1,0)\} + \{G(5,2) \times F(2,0)\}$$

$$B1 = \{G(3,2)\} \times F(0,1) + \{G(4,2) \times F(1,1)\} + \{G(5,2) \times F(2,1)\}$$

$$B2 = \{G(3,2)\} \times F(0,2) + \{G(4,2) \times F(1;2)\} + \{G(5,2) \times F(2,2)\}$$

After this computation processing, Σ FiGi is calculated and averaged, and then, next computation of a next data line is carried out (that is, a next line data is loaded). The result of computation is stored in a surface (G') other than that for the image data of the memory array 5. Note that a result of computation other than the filter computation may be stored in the same surface as that for the image data.

Figure 9A:
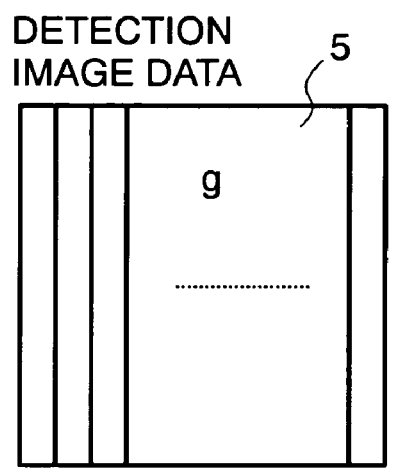
FIG. 9A is a diagram of a configuration of detection image data g.
Figure 9B:
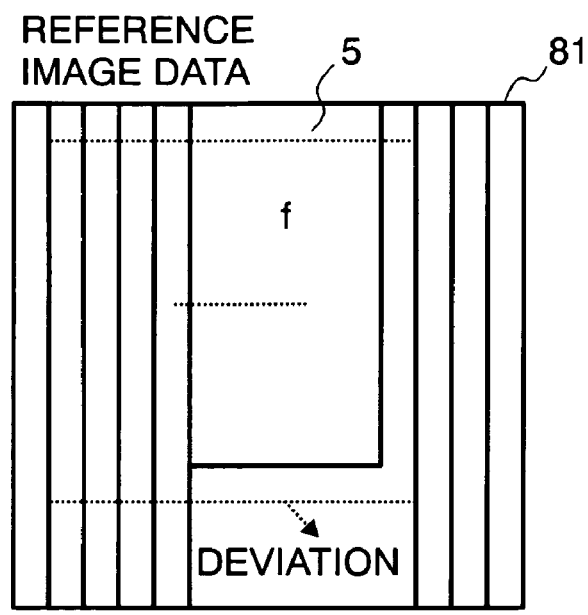
FIG. 9B is a diagram of a configuration of reference image data f.
Figure 9C:
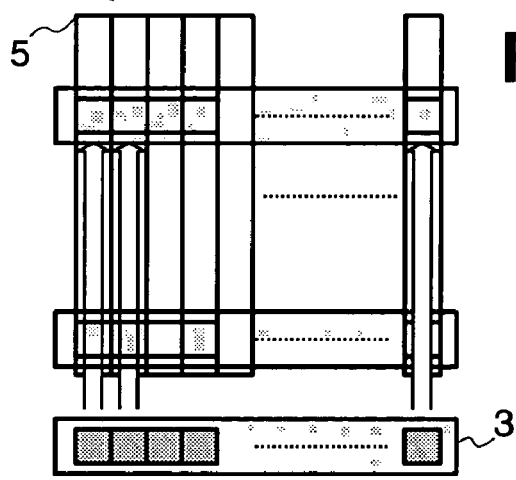
FIG. 9C is a diagram showing a state in which an operation array 3 loads data from a memory array 5 in units of rows in sequence.
Figure 9D:
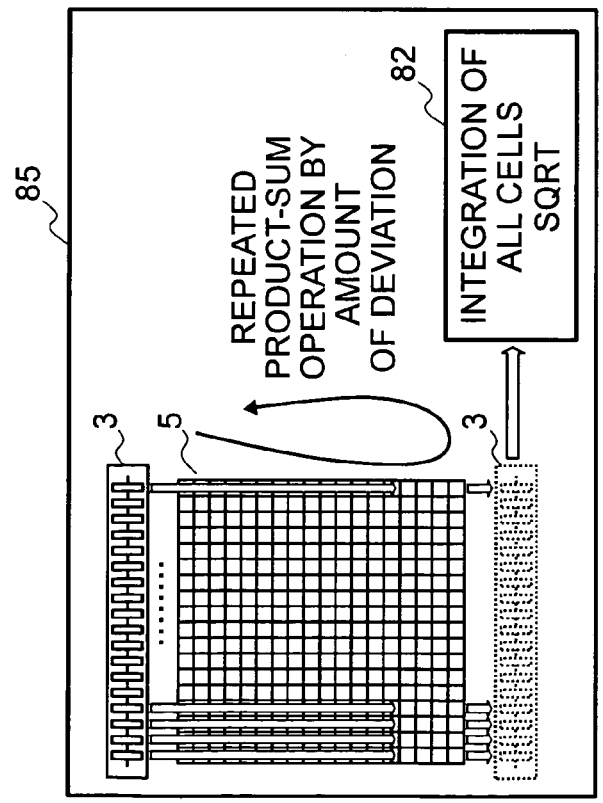
FIG. 9D shows a state in which the operation array 3 sequentially loading the data from the memory array 5 in units of rows performs the computation processing.
Figure 9E:
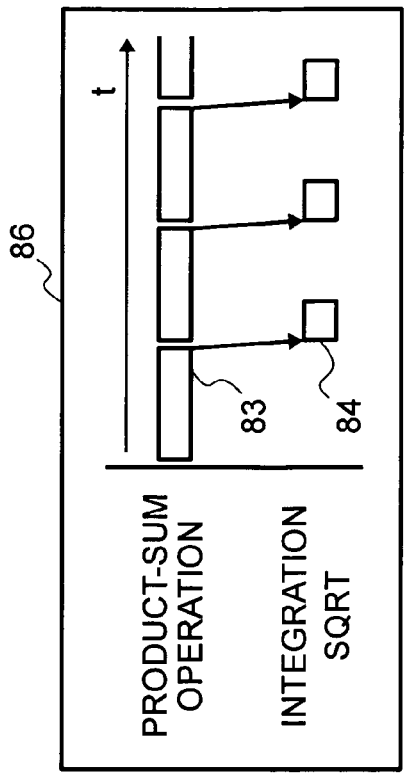
FIG. 9E shows a time chart of the computation processing.

FIGS. 9A to 9E illustrates an example of a normalization correlation operation of the image data. A coefficient of correlation between reference image data f of FIG. 9B and detection image data g of FIG. 9A is determined. A reference part of the reference image data f is shifted to take a correlation (81). When the image processor 300 of the inspection system of the embodiment performs the normalization correlation operation, as shown in FIG. 9C, the operation array 3 loads the data from the memory array 5 in units of rows in sequence, whereby the computation is performed as designated by reference numeral 85 of FIG. 9D. The normalization correlation operation needs integration and route computation of the result of each operation cell 19. The integration and route computation is not performed in units of pixels, and thus can be executed not by the operation array 3, but by the multistage buffer 4 and the ALU 8 shown in FIG. 3. At this time, as shown in a time chart designated by reference numeral 86 of FIG. 9E, the calculation of the operation array 3 and the computation of the ALU 8 can be performed in a pipeline manner, and thus the image processor 300 of the embodiment can execute the normalization correlation operation with efficiency at high speeds.

Using detection image data F shown in FIG. 10A, and reference image data G shown in FIG. 10B, an operation of the cells in the normalization correlation operation will be illustrated. In the figure, f×f, f×g, and g×g, which serve as computing elements of a basic formula of the normalization correlation operation, are shown. The operation array 3 loads necessary data from the memory array 5 which stores therein the data f and g, and performs the computation. For example, the OP [4] in the figure has the following computing elements for the normalization correlation operation:

$$f \times f = \{f(4,0) \times f(4,0)\}$$

$$f \times g = \{f(4,0) \times g(4,0)\}$$

$$g \times g = \{g(4,0) \times g(4,0)\}$$

After completing the computation up to L[n], the reference part of F is shifted as designated by reference numeral 81 of FIG. 9, and the computation is performed again. Thus, calculation of an amount of the deviation detected by, for example, the positional deviation detector 119, can be performed at high speeds in the normalization correlation operation by the image processor 300.

FIG. 11 shows an example of parallel connection of processors according to the embodiment. The processors of the embodiment constitute the operation arrays 3 for collectively operating based on the master sequence 2 and the control signal therefrom. The data bus between the control signal and the corresponding operation cell is connected to between the processors. This can increase the number of the computing units, thereby improving the computing power. At this time, the computing performance of the processors can be improved without changing the control of the computation sequence. This can collectively compute a large image area, thereby improving the processing capability. The optical defect inspection system has a large width of the image data to be obtained by one scan, and can allocate the image signal from the detector 101 to the image processor 300 for every tap. This increases the width of the image data, and can improve the through put for the image processing only by the parallel connection of the image processors 300 even in the detection system in which the number of taps is increased, without changing the image processing program.

FIG. 12 shows an example in which computation data transmitting means for the processors of the embodiment is provided. When the computation data is supplied to the image processor 300 on a condition in which the processors are arranged in parallel, the number of supplied signals (and the number of pins) is increased with increased number of the processors 0 arranged in parallel. In this case, this may lead to an increase of size of a substrate, and an increase in cost. In this example, a computation data input bus is connected to an output bus, and the computation data is supplied from its source to one or a few processors, so that the data is transmitted between the processors. This can supply the computation data to all processors. Since the computation of this embodiment is performed by a structure of the computing units arranged and expanded in parallel, it is not necessary to change the format of the data from the data source in connection with the data transmitting bus, from the format of the data when it is supplied to each processor.

As can be seen from the above description, the invention can improve the processing speed which achieves a high operating rate of the computing units, while reducing the hardware resource consumption, thereby facilitating improvement in the computing power.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. An apparatus for inspecting defects of a semiconductor wafer, comprising:
    image obtaining means for sensing a surface of the semiconductor wafer and detecting image data of pixels in sequence;
    image processing means for processing the image data obtained by the image obtaining means, extracting defects from the image data and classifying the defects; and
    output means for outputting the classified defects;
    wherein the image processing means has
    a data memory part which has a two-dimensional memory array of M×N pixel size sequentially storing a plurality of N×1 pixel size data obtained by said image obtaining means, and each of said N×1 pixel size data being sequentially stored into the memory array,
    an operation array which provides M operation units,
    each of said N×1 pixel size data being processed in sequence by a corresponding one of said M operation units of the operation array for every N×1 pixel size data sequentially stored in said memory array,
    an instruction memory which stores prescribed program code,
    a master sequencer which transmits a control signal based on the program code stored in the instruction memory and collectively controls the operation units, and
    a shift bus which only connects adjacent ones of said M operation units and which shifts the image data bidirectionally only between adjacent ones of said M operation units of the operation array.

2. The apparatus for inspecting defects of a semiconductor wafer according to claim 1, wherein said image obtaining means is optical image obtaining means of a dark field type, or of a bright field type.

3. The apparatus for inspecting defects of a semiconductor wafer according to claim 1, wherein said image obtaining means is SEM type image obtaining means adapted for irradiating and scanning the semiconductor device with a converged electron beam so as to detect a secondary electron therefrom.

4. The apparatus for inspecting defects of a semiconductor wafer according to claim 1, wherein said M operation units are connected in rows in parallel, and said shift bus transmits the data between the M operation units connected in rows in parallel.

5. The apparatus for inspecting defects of a semiconductor wafer according to claim 1, wherein said image processing means further includes a data storage section for storing therein a result of the computation by each of said M operation units connected in rows in parallel, and said shift bus connects said data storage section to a pipeline structure.

6. The apparatus for inspecting defects of a semiconductor wafer according to claim 1, wherein said output means outputs a result processed by said image processing means to an external processor.

7. A method for inspecting defects of a semiconductor, wafer comprising the steps of:
   obtaining an image of a semiconductor device for sensing a surface of the semiconductor water and detecting image data of pixels in sequence; and
   processing the image data obtained to detect a defect on the semiconductor device, and extracting defects from the image data and classifying the defects,
   wherein in the image processing step,
   sequentially storing a plurality of N×1 pixel size data obtained by said image obtaining means in a data memory part which has a two-dimensional memory array of M×N pixel size,
   processing said N×1 pixel size data with an operation array providing M operation units,
   said N×1 pixel size data each being processed in sequence by corresponding ones of said M operation units of the operation array for every N×1 pixel size data sequentially stored in said memory array,
   storing in an instruction memory prescribed program code,
   transmitting by a master sequencer a control signal based on the program code stored in the instruction memory and collectively controls the operation units, and
   shifting by a shift bus, which only connects adjacent ones of said M operation units, the image data bidirectionally only between adjacent ones of said M operation units of the operation array.

\* \* \* \* \*